United States Patent
Osterman

[19]

[11] Patent Number: 5,892,431
[45] Date of Patent: Apr. 6, 1999

[54] POWER MULTIPLEXER FOR BROADBAND COMMUNICATIONS SYSTEMS

[75] Inventor: Thomas S. Osterman, Bainbridge Island, Wash.

[73] Assignee: Alpha Technologies, Inc., Bellingham, Wash.

[21] Appl. No.: 82,087

[22] Filed: May 20, 1998

Related U.S. Application Data

[60] Provisional application No. 60/047,300 May 20, 1997.
[51] Int. Cl.⁶ .................................................. H04M 11/04
[52] U.S. Cl. ................................. 340/310.01; 340/310.07
[58] Field of Search ........................ 340/310.01, 310.02, 340/310.03, 310.04, 310.05, 310.06, 310.07, 310.08

[56] References Cited

U.S. PATENT DOCUMENTS

| | | | |
|---|---|---|---|
| 4,446,458 | 5/1984 | Cook | 340/310.01 |
| 5,467,384 | 11/1995 | Skinnner, Sr. | 340/310.01 |
| 5,581,246 | 12/1996 | Yarberry et al. | 340/310.01 |
| 5,664,002 | 9/1997 | Skinner, Sr. | 340/310.01 |

*Primary Examiner*—Nina Tong
*Attorney, Agent, or Firm*—Michael R. Schacht; Hughes & Schacht, P.S.

[57] ABSTRACT

A system and method for providing a power signal to a local service portion of a communication system located in a densely populated area. A power multiplexer is provided having first, second, and third input connector assemblies, an output connector assembly, and a switching network. The output connector assembly is connected to a load in the communications network that is normally provided by a local utility power source. The input connector assemblies are connected to remote power sources of the communication system located outside the given local service area. The switching network connects one of the input connectors to the output connector assembly to pass to the load, as necessary, a power signal generated by one of the remote utility power sources. Because the remote utility power service and the local utility power service are unlikely to be disrupted in many situations, reliable power can usually be obtained even if local service is disrupted.

2 Claims, 2 Drawing Sheets

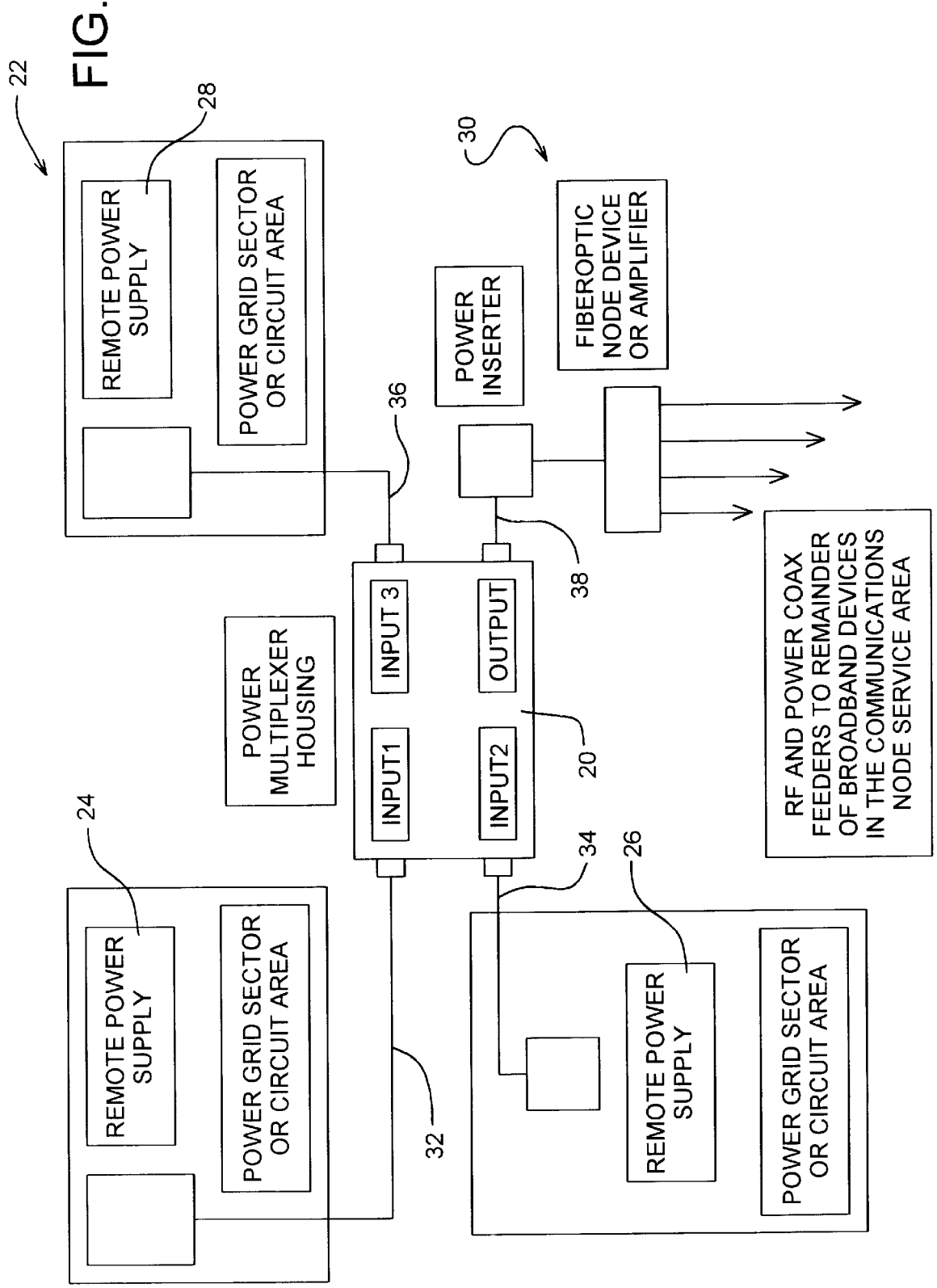

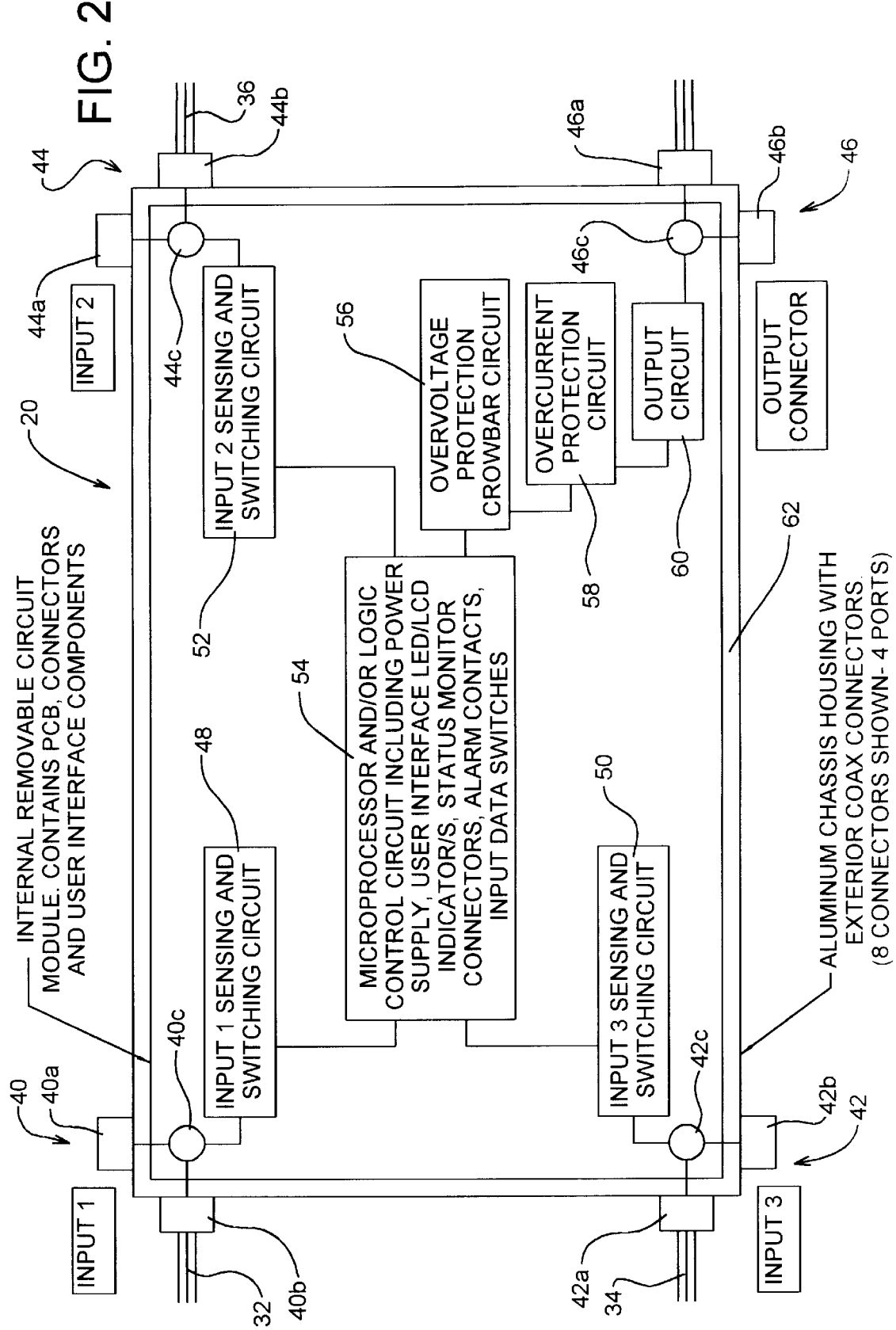

POWER MULTIPLEXER FOR BROADBAND COMMUNICATIONS SYSTEMS

RELATED APPLICATIONS

This application claims priority of U.S. Provisional Application Ser. No. 60/047,300 filed on May 20, 1997.

FIELD OF THE INVENTION

The present invention relates to power supplies for providing power to broadband communications systems and, more particularly, to power supplies that provide power to such systems when local utility power does not meet certain requirements.

BACKGROUND OF THE INVENTION

Conventionally, coaxial cable signal distribution systems have been used to distribute television signals from a headend to end users. While interruptions to cable television (CATV) service are irritating and to be avoided, they are tolerated to a certain degree.

Coaxial cable signal distribution systems are currently being or soon will be used to transmit communications systems between end users. The tolerance for service disruptions in communications system is much lower than that for a CATV system. Accordingly, the CATV industry is taking more rigorous steps to avoid service disruptions in their coaxial cable signal distribution systems.

More specifically, coaxial cable signal distribution systems employ line extending amplifiers distributed throughout the system. The signal carried by the coaxial cable comprises a low frequency power portion and a high frequency information portion. The line extending amplifiers use the power portion to boost the signal strength of the information portion.

Power supplies are distributed throughout the coaxial cable signal distribution system to supply the power portion of the signal carried thereby. These power supplies are normally uninterruptible power supplies that obtain primary power from a utility power source and standby power from batteries. If the utility power source fails, a standby signal is generated using power supplied by the batteries. This level of back up has proven to be very effective in CATV signal distribution systems, but may not provide an adequate level of back up when the coaxial system is used to distribute communications signals.

A primary object of the present invention is thus to provide improved methods and systems for supplying power signals to coaxial cable signal distribution systems.

BRIEF DESCRIPTION OF THE DRAWINGS

FIG. 1 is a block diagram depicting a power multiplexer of the present invention and a typical environment in which this power multiplexer will be used;

FIG. 2 depicts the housing and block diagram of the power multiplexer depicted in FIG. 1.

SUMMARY AND BACKGROUND OF THE INVENTION

The Applicants have recognized that, in many high density metropolitan locations, while power may be disrupted in a single block, power reliability on a multi-block area is very good. Power outages tend to be limited to specific blocks due to local faults or intentional outages due to construction and similar activities. Rarely does power fail to adjacent city blocks.

The present invention is a power multiplexer that supplies power to communications equipment in a given local service area. The power multiplexer accepts three individual AC power input feeds from up to three remote non-standby power supplies located outside the given local service area. If local power service is disrupted, the power multiplexer supplies power to the communications equipment in the given local service area using power signals generated by the remote power supplies.

More specifically, the present invention is a power multiplexer comprising first, second, and third input connector assemblies, an output connector assembly, and a switching network. The output connector assembly is connected to a load (the communications equipment) in the given local service area power to which is normally provided by a local utility power source.

The input connector assemblies are connected to remote power sources located outside the given local service area; these remote power sources are powered by different portions of the utility power grid and, most likely, not all of these remote power sources will be affected by a power outage in the given local service area.

If the utility power service in the local service area is disrupted, the switching network connects one of the input connectors to the output connector assembly to pass a power signal generated by one of the remote utility power sources. The present invention thus takes advantage of the fact that utility power service in remote service areas outside of the local service area is often not disrupted.

In the event of a single power supply failure or power outage, the present invention simply switches to another input to provide continuous power to the communications node and other active devices of the communications system serving the locals service area. As long as one of the plurality of inputs has valid voltage present, the output power will continue to operate the system.

The intended transmission conductor is coaxial cable. The individual power feeds from each remote power supply will not have RF signal present on the coax cable. Due to the lack of RF limitations, the power feed coax cable can reliably transmit AC power over a reasonable distance with up to 25 amperes of current.

If power inserters are not used at the power supplies, up to 25 amperes of current could be routed from each power supply location via coax to the power multiplexer of the present invention and thus to its outputs.

At this point, current would have to be split by power inserters in at least two directions so that the current would not exceed power inserter and amplifier "through-current" limitations. In most applications, the typical current draw would be 15 amperes or less (provided by standard non-standby power supplies). The higher current specification of 25 amperes if for future reference where higher currents may be desirable for broadband telephony powering requirements.

DETAILED DESCRIPTION OF THE PREFERRED EMBODIMENT

Referring now to FIG. 1, depicted at 20 therein is a power multiplexer constructed in accordance with, and embodying, the principles of the present invention. This multiplexer 20 is located in a given local service area and is part of a powering system 22 that further comprises power supplies 24, 26, and 28 located in adjacent services areas. The system 22 provides power to communications equipment 30.

The power supplies 24, 26, and 28 may be non-standby or standby (including back-up batteries and an inverter circuit)

supplies. They typically generate power signals of 60, 75, or 90 VAC (nominal). The power signals are generally quasi-square waveforms that are specific to the broadband communications equipment 30.

The power supplies 24, 26, and 28 are connected to the multiplexer 20 by coaxial cables 32, 34, and 36. The power multiplexer 20 is connected to the communications equipment 30 by a coaxial cable 38. The output power signal generated by the power multiplexer 20 is present on the cable 38.

Power signals on the coaxial cables 32, 34, and 36 form the inputs to the power multiplexer 20. As shown in FIG. 2, the cables 32, 34, and 36 are attached to input connector assemblies 40, 42, and 44 of the multiplexer 20. The output cable 38 is connected to an output connector assembly 46. The connector assemblies 40–46 each comprise first and second connectors and an internal terminal; the first and second connectors and internal terminal are identified by the reference character of the associated connector assembly with the letters a, b, and c, respectively, appended thereto. The use of first and second connectors connected to a single internal terminal provides the installer with significant flexibility to accommodate different cable runs.

Associated with each input terminal assembly is a sensing and switching circuit 48, 50, and 52. These circuits 48, 50, and 52 determine whether the power signal on the associated cables 32, 34, and 36 are within certain predetermined parameters; if not, a switch opens and prevents the multiplexer 20 from generating power based on that signal.

The power signals passed by the circuits 48, 50, and 52 are input to a control circuit 54. This circuit 54 contains a microprocessor and/or logic circuitry that selects one of the power signals as a user defined default priority input signal, with the others being ranked by the user second and third in terms of priority. This circuit 54 also contains power supply user interface components such as LED/LCD indicator(s), status monitoring connectors, alarm contacts, and input data switches.

The output of the circuit 54 is passed to the output connector assembly 46 through an overvoltage protection crowbar circuit 56, and overcurrent protection circuit 58, and an output circuit 60.

The operating voltage range of the multiplexer 20 is 0–150 volts AC, and the multiplexer 20 can operate with a frequency range of 1 Hz to 100 Hz, which includes the power device frequency of currently available standard communications systems.

The multiplexer 20 further comprises an aluminum housing 62 that can be identical or similar to housing used for line extending amplifiers in CATV signal distribution systems. The attached Exhibit A provides further specifications of the multiplexer 20.

From the foregoing, it should be clear that the invention may be embodied in other specific forms without departing from the spirit or essential characteristics thereof. The present embodiments are therefore to be considered in all respects as illustrative and not restrictive.

I claim:

1. A system for providing a power signal to a given portion of a communications system, where the given portion of the communications system are located within a local service area containing a local utility power source, the system comprising:

a plurality of remote power supplies located outside the local service area, where the remote power supplies generate power signals based on separate remote utility power sources that are not likely to be disrupted by disruption of the local utility power source; and a power multiplexer comprising
   a plurality of input connector assemblies,
   an output connector assembly adapted to be connected to the given portion of the communications system, and
   a switching circuit connected between the input connector assemblies and the output connector assembly; and a plurality of coaxial cables, where each coaxial cable transmits the power signal generated by one of the remote power supplies to one of the input connector assemblies; wherein the switching circuit operates in
   a first mode in which the power signals present at the input connector assemblies are prevented from reaching the output connector assembly, and
   a second mode in which the power signal presented at one of the input connector assemblies is transmitted to the output connector assembly to supply power to the given portion of the communications system.

2. A method of providing a power signal to a given portion of a communications system, where the given portion of the communications system is located within a local service area, the method comprising the steps of:

providing a plurality of power supplies for generating power signals based on a utility power system;

determining the location of at least one remote power supply, where the remote power supply generates power signals based on portion of the utility power system that is not likely to be disrupted by disruption of the utility power system within the local service area; and providing a power multiplexer comprising
   at least one input connector assembly, p2 an output connector assembly adapted to be connected to the given portion of the communications system, and
   a switching circuit connected between the input connector assembly and the output connector assembly; and connecting a plurality of coaxial cables between the remote power supply and the at least one input connector assembly to transmit the power signal generated by one of the remote power supplies to the input connector assembly; wherein operating the switching circuit
   a first mode in which the power signals present at the input connector assemblies are prevented from reaching the output connector assembly, and
   a second mode in which the power signal presented at one of the input connector assemblies is transmitted to the output connector assembly to supply power to the given portion of the communications system.

* * * * *